United States Patent
Shin et al.

(10) Patent No.: US 12,360,566 B2
(45) Date of Patent: Jul. 15, 2025

(54) ROLLABLE ELECTRONIC DEVICE INCLUDING GEAR ASSEMBLY

(71) Applicant: SAMSUNG ELECTRONICS CO., LTD., Suwon-si (KR)

(72) Inventors: Moonchul Shin, Suwon-si (KR); Myunghoon Kwak, Suwon-si (KR); Youngmin Kang, Suwon-si (KR); Yeonggyu Yoon, Suwon-si (KR); Seungjoon Lee, Suwon-si (KR); Joongyeon Cho, Suwon-si (KR); Junyoung Choi, Suwon-si (KR); Jooyoung Kang, Suwon-si (KR); Soyoung Lee, Suwon-si (KR); Junghyeob Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 17/957,547

(22) Filed: Sep. 30, 2022

(65) Prior Publication Data

US 2023/0189460 A1   Jun. 15, 2023

Related U.S. Application Data

(63) Continuation of application No. PCT/KR2022/013457, filed on Sep. 7, 2022.

(30) Foreign Application Priority Data

Dec. 14, 2021   (KR) .................. 10-2021-0178368
Jan. 3, 2022   (KR) .................. 10-2022-0000335

(51) Int. Cl.
*G06F 1/16*   (2006.01)
*H04M 1/02*   (2006.01)

(52) U.S. Cl.
CPC .......... *G06F 1/1652* (2013.01); *G06F 1/1624* (2013.01); *H04M 1/0237* (2013.01); *H04M 1/0268* (2013.01)

(58) Field of Classification Search
CPC ... H05K 5/0217; G06F 1/1624; G06F 1/1652; H04M 1/0237; H04M 1/0268
See application file for complete search history.

(56) References Cited

U.S. PATENT DOCUMENTS 10,747,269 B1 *   8/2020   Choi ................ G06F 1/1652
11,095,761 B1 *   8/2021   Lim ................ H04M 1/0268
(Continued)

FOREIGN PATENT DOCUMENTS

CN   201240326   5/2009
CN   112732021   4/2021
(Continued)

OTHER PUBLICATIONS

Extended Search Report dated Oct. 23, 2024 in European Patent Application No. 22907623.7.
(Continued)

*Primary Examiner* — Nidhi Thaker
(74) *Attorney, Agent, or Firm* — Nixon & Vanderhye, P.C.

(57) ABSTRACT

An electronic device may include a first housing configured to slide with respect to the second housing, a second housing receiving at least a portion of the first housing, a display configured to be unfolded based on sliding of the first housing, a motor structure configured to generate a driving force for the sliding of the first housing, the motor structure disposed on the second housing, and a gear assembly including a first gear connected to the motor structure, a rack gear connected to the first housing and configured to slide along with the first housing, a second gear configured to (Continued)

mesh with the rack gear, and a third gear connected to the second gear and configured to rotate based on rotation of the first gear.

15 Claims, 11 Drawing Sheets

(56) References Cited

U.S. PATENT DOCUMENTS

| | | | |
|---|---|---|---|
| 2013/0058063 A1* | 3/2013 | O'Brien | G06F 1/1624 |
| | | | 361/807 |
| 2020/0033913 A1* | 1/2020 | Yang | H04M 1/0268 |
| 2020/0168131 A1 | 5/2020 | Park et al. | |
| 2020/0264660 A1* | 8/2020 | Song | H04M 1/0241 |
| 2020/0363841 A1 | 11/2020 | Kim et al. | |
| 2021/0181801 A1 | 6/2021 | Yin | |
| 2022/0166861 A1* | 5/2022 | Lim | G06F 1/1681 |
| 2022/0253103 A1 | 8/2022 | Choi et al. | |
| 2022/0322550 A1* | 10/2022 | Yin | H05K 5/0217 |
| 2024/0422928 A1* | 12/2024 | Yoon | G06F 1/1686 |

FOREIGN PATENT DOCUMENTS

| | | | | |
|---|---|---|---|---|
| CN | 112732021 A | * | 4/2021 | G06F 1/1618 |
| CN | 215068970 U | * | 12/2021 | |
| KR | 10-2011-0082943 | | 7/2011 | |
| KR | 101179115 B1 | * | 9/2012 | |
| KR | 10-2019-0062855 | | 6/2019 | |
| KR | 10-2020-0013821 | | 2/2020 | |
| KR | 10-2020-0144822 | | 12/2020 | |
| KR | 10-2021-0031348 | | 3/2021 | |
| KR | 10-2021-0118850 | | 10/2021 | |
| KR | 10-2021-0148396 | | 12/2021 | |
| WO | 2021/015310 | | 1/2021 | |
| WO | 2021/0115334 | | 6/2021 | |
| WO | 2021/201309 | | 10/2021 | |

OTHER PUBLICATIONS

Search Report dated Dec. 12, 2022 in International Patent Application No. PCT/KR2022/013457.
Written Opinion dated Dec. 12, 2022 in International Patent Application No. PCT/KR2022/013457.

* cited by examiner

ROLLABLE ELECTRONIC DEVICE INCLUDING GEAR ASSEMBLY

CROSS-REFERENCE TO RELATED APPLICATIONS

This application is a continuation of International Application No. PCT/KR2022/013457 designating the United States, filed on Sep. 7, 2022, in the Korean Intellectual Property Receiving Office and claiming priority to Korean Patent Application No. 10-2021-0178368, filed on Dec. 14, 2021, and to Korean Patent Application No. 10-2022-0000335 filed on Jan. 3, 2022, in the Korean Intellectual Property Office, the disclosures of all of which are incorporated by reference herein in their entireties.

BACKGROUND

Field

The disclosure relates to a rollable electronic device including a gear assembly.

Description of Related Art

With the development of information and communication technology and semiconductor technology, various functions are being integrated into one portable electronic device. For example, an electronic device may implement not only communication functions, but also entertainment functions, such as playing games, multimedia functions, such as playing music and videos, communication and security functions for mobile banking, and scheduling and e-wallet functions. Such electronic devices become compact enough for users to carry in a convenient way.

As mobile communication services extend up to multimedia service sectors, electronic devices require a larger display to allow users satisfactory use of multimedia services as well as voice call or text messaging services. This, however, trades off the trend of electronic devices being compact.

SUMMARY

According to various embodiments of the disclosure, an electronic device may include a housing including a first housing and a second housing receiving at least a portion of the first housing and configured to slide with respect to the first housing, a display configured to be unfolded based on sliding of the first housing, a motor structure configured to generate a driving force for the sliding of the first housing, the motor structure disposed on the second housing, and a gear assembly including a first gear connected to the motor structure, a rack gear connected to the first housing and configured to slide along with the first housing, a second gear configured to mesh with the rack gear, and a third gear connected to the second gear and configured to rotate based on rotation of the first gear.

According to various embodiments of the disclosure, an electronic device may include a housing including a first housing and second housing configured to slide with respect to the first housing, a display including a first display area disposed on the second housing and a second display area extending from the first display area and configured to be unfolded based on sliding of the first housing, a motor structure configured to generate a driving force for moving the first housing, the motor structure connected to the second housing, and a gear assembly including a first gear connected to the motor structure, a rack gear connected to the first housing and configured to slide along with the first housing, a second gear configured to mesh with the rack gear, a third gear configured to rotate, along with the second gear, based on rotation of the first gear, and a fourth gear configured to mesh with the first gear and the third gear.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
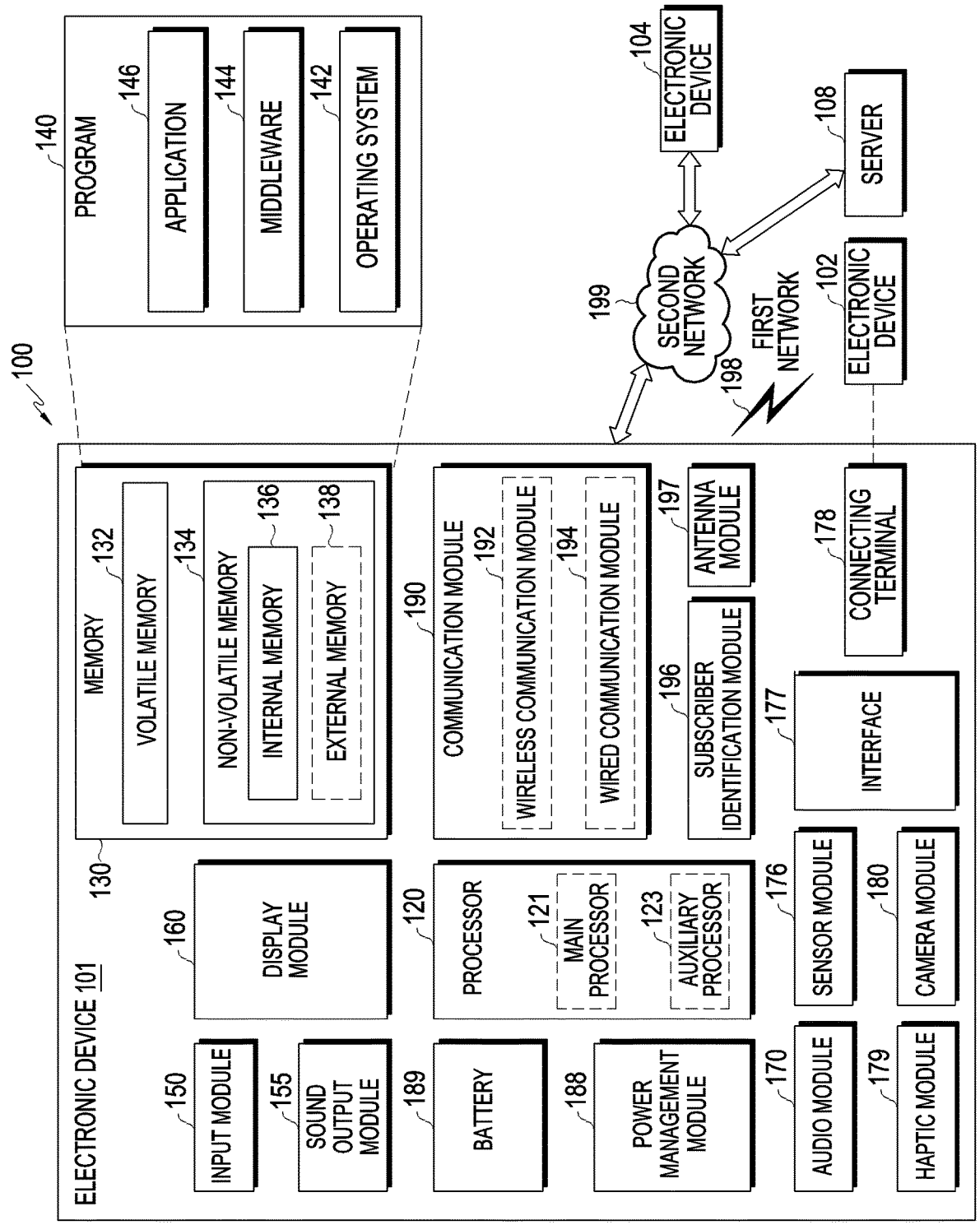
FIG. 1 is a block diagram illustrating an electronic device in a network environment according to an embodiment of the disclosure.

FIG. 1 is a block diagram illustrating an electronic device in a network environment according to various embodiments of the disclosure;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of or including a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
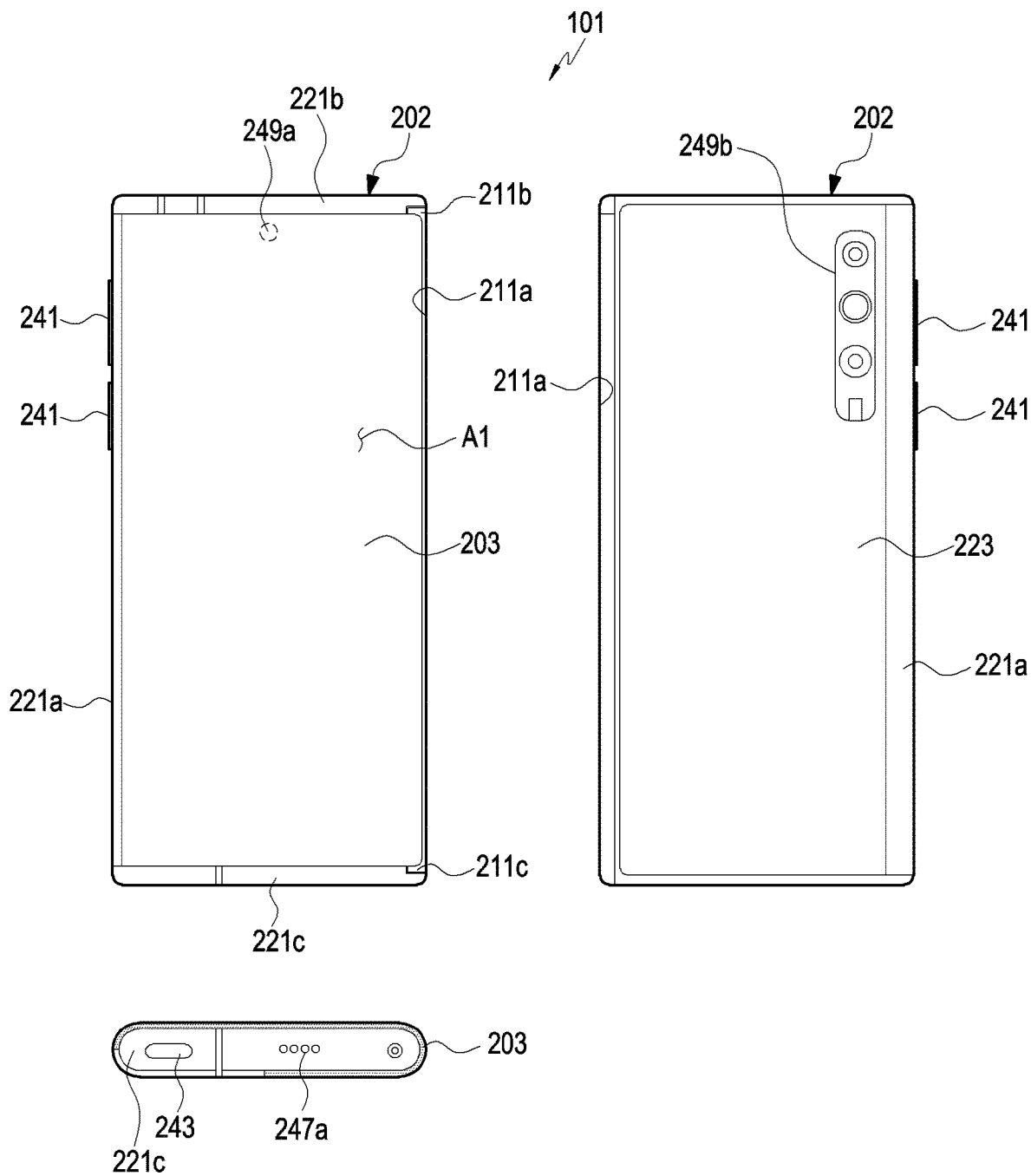
FIG. 2 is a view illustrating an electronic device in a closed state, according to an embodiment of the disclosure.
Figure 3:
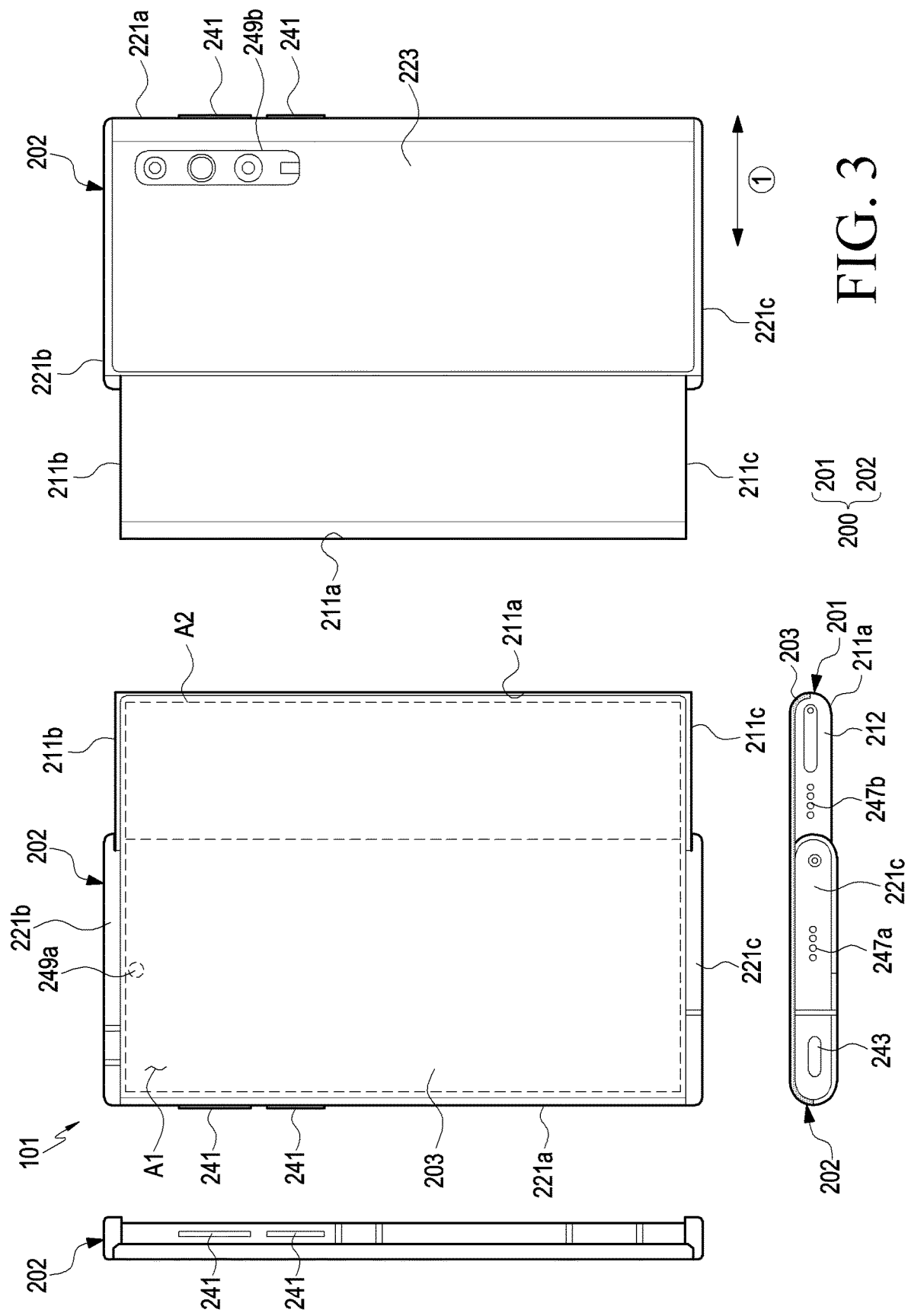
FIG. 3 is a view illustrating an electronic device in an opened state, according to various embodiments of the disclosure.

FIG. 2 is a view illustrating an electronic device in a closed state, according to various embodiments of the disclosure. FIG. 3 is a view illustrating an electronic device in an opened state, according to various embodiments of the disclosure. For example, FIG. 2 is a view illustrating a state in which a second display area A2 is received in a housing 200. FIG. 3 is a view illustrating a state in which at least a portion of the second display area A2 is visually exposed to the outside of the housing 200.

The state shown in FIG. 2 may be denoted as a first housing 201 being closed with respect to a second housing 202, and the state shown in FIG. 3 may be denoted as the first housing 201 being open with respect to the second housing 202. According to an embodiment, the "closed state" or "opened state" may refer, for example, to a closed or opened state of the electronic device.

Referring to FIGS. 2 and 3, the electronic device 101 may include a housing 200. The housing 200 may include a second housing 202 and a first housing 201 that is movable with respect to the second housing 202. According to an embodiment, the electronic device 101 may have a structure in which the second housing 202 is slidably disposed on the first housing 201. According to an embodiment, the first housing 201 may be disposed to perform reciprocating motion by a predetermined distance in a predetermined direction with respect to the second housing 202, for example, a direction indicated by an arrow 1̂. The configuration of the electronic device 101 of FIGS. 2 and 3 may be identical in whole or part to the configuration of the electronic device 101 of FIG. 1.

According to an embodiment, the first housing 201 may be referred to, for example, as, a first structure, a slide part, or a slide housing, and may be disposed to reciprocate on the second housing 202. According to an embodiment, the second housing 202 may be referred to, for example, as, a second structure, a main part, or a main housing. The second housing 202 may receive at least a portion of the first housing 201 and may guide the sliding of the first housing 201. According to an embodiment, the second housing 202 may receive various electrical and electronic components, such as a main circuit board or a battery. According to an embodiment, at least a portion (e.g., the first display area A1) of the display 203 may be visually exposed to the outside of the housing 200. According to an embodiment, another portion (e.g., the second display area A2) of the display 203 may be received into the inside of the second housing 202 (e.g., a slide-in motion) or be visually exposed to the outside of the second housing 202 (e.g., a slide-out motion) as the first housing 201 moves (e.g., slides) with respect to the second housing 202. According to an embodiment, a motor, a speaker, a sim socket, and/or a sub circuit board electrically connected with a main circuit board may be disposed in the first housing 201. A main circuit board on which electrical components, such as an application processor (AP) and a communication processor (CP), are mounted may be disposed in the second housing 202.

Figure 4:
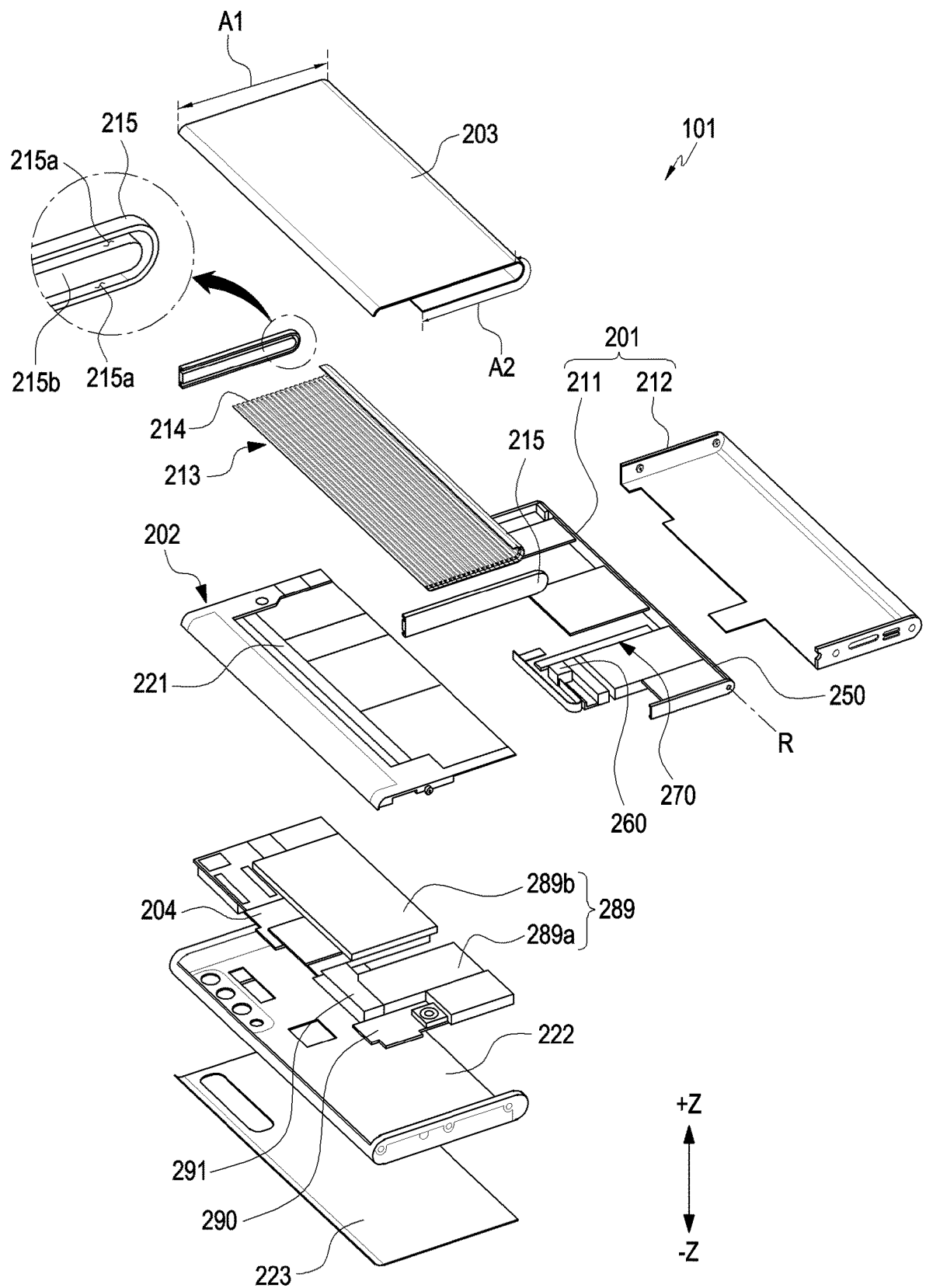
FIG. 4 is an exploded perspective view illustrating an electronic device according to an embodiment of the disclosure.

According to various embodiments, the first housing 201 may include first sidewalls 211a, 211b, and 211c for surrounding at least a portion of the display 203 and/or the display supporting member (e.g., the display supporting member 213 of FIG. 4). According to an embodiment, the first sidewalls 211a, 211b, and 211c may extend from the first plate 211. The first sidewalls 211a, 211b, and 211c may include a 1-2th sidewall 211b, a 1-3th sidewall 211c opposite to the 1-2th sidewall 211b, and a 1-1th sidewall 211a extending from the 1-2th sidewall 211b to the 1-3th sidewall 211c. The 1-1th sidewall 211a may be substantially perpendicular to the 1-2th sidewall 211b and/or the 1-3th sidewall 211c. According to an embodiment, in the closed state (e.g., FIG. 2) of the electronic device 101, the 1-2th sidewall 211b may face the 2-2th sidewall 221b of the second housing 202, and the 1-3th sidewall 211c may face the 2-3th sidewall 221c of the second housing 202. According to an embodiment, the 1-1th sidewall 211a, the 1-2th sidewall 211b, and/or the 1-3th sidewall 211c may be integrally formed with a first plate (e.g., the first plate 211 or slide cover 212 of FIG. 4). According to another embodiment, the 1-1th sidewall 211a, the 1-2th sidewall 211b, and/or the 1-3th sidewall 211c may be formed as separate housings and be combined or assembled.

According to various embodiments, the second housing 202 may include second sidewalls 221a, 221b, and 221c to surround at least a portion of the first housing 201. According to an embodiment, the second sidewalls 221a, 221b, and 221c may extend from a second plate (e.g., the second plate 221 of FIG. 4) and/or a cover member (e.g., the cover member 222 of FIG. 4). According to an embodiment, the second sidewalls 221a, 221b, and 221c may include a 2-2th sidewall 221b, a 2-3th sidewall 221c opposite to the 2-2th sidewall 221b, and a 2-1th sidewall 221a extending from the 2-2th sidewall 221b to the 2-3th sidewall 221c. According to an embodiment, the 2-1th sidewall 221a may be substantially perpendicular to the 2-2th sidewall 221b and/or the 2-3th sidewall 221c. According to an embodiment, the 2-2th sidewall 221b may face the 1-2th sidewall 211b, and the 2-3th sidewall 221c may face the 1-3th sidewall 211c. For example, in the closed state (e.g., FIG. 2) of the electronic device 101, the 2-2th sidewall 221b may cover at least a portion of the 1-2th sidewall 211b, and the 2-3th sidewall 221c may cover at least a portion of the 1-3th sidewall 211c.

According to various embodiments, the second housing 202 may be formed to be open at one side (e.g., a front face) to receive (or surround) at least a portion of the first housing 201. For example, the first housing 201 may be connected to the second housing 202 while being at least partially surrounded by the 2-1th sidewall 221a, the 2-2th sidewall 221b, and the 2-3th sidewall 221c and may be slid in the direction of arrow ① while being guided by the second housing 202. According to an embodiment, the cover member (e.g., the cover member 222 of FIG. 4), the 2-1th sidewall 221a, the 2-2th sidewall 221b, and/or the 2-3th sidewall 221c may be formed integrally. According to another embodiment, the second cover member 222, the 2-1th sidewall 221a, the 2-2th sidewall 221b, and/or the 2-3th sidewall 221c may be formed as separate housings and be combined or assembled.

According to various embodiments, the second housing 202 may include a rear plate 223. According to an embodiment, the rear plate 223 may form at least a portion of the exterior of the electronic device 101. For example, the rear plate 223 may provide a decorative effect on the exterior of the electronic device 101.

According to various embodiments, the cover member 222 and/or the 2-1th sidewall 221a may cover at least a portion of the display 203. For example, at least a portion of the display 203 (e.g., the second display area A2) may be received in the second housing 202, and the cover member 222 and/or the 2-1th side wall 221a may cover a portion of the display 203 received in the second housing 202.

According to various embodiments, the electronic device 101 may include a display 203. For example, the display 203 may be, for example, a flexible display or a rollable display. According to an embodiment, at least a portion of the display 203 (e.g., the second display area A2) may slide based on the sliding movement of the first housing 201. According to an embodiment, the display 203 may include, or be disposed adjacent to, a touch detection circuit, a pressure sensor capable of measuring the intensity (pressure) of a touch, and/or a digitizer that detects a magnetic field-type stylus pen. The configuration of the display 203 of FIGS. 2 and 3 may be identical in whole or part to the configuration of the display module 160 of FIG. 1.

According to various embodiments, the display 203 may include a first display area A1 and a second display area A2. According to an embodiment, the first display area A1 may be an area that is always visible from the outside. According to an embodiment, the first display area A1 may be an area that cannot be positioned inside the housing 202. According to an embodiment, the first display area A1 may be seated on a portion (e.g., the first plate 211) of the first housing 201. According to an embodiment, the second display area A2 may extend from the first display area A1, and the second display area A2 may be inserted or received in, or visually exposed to the outside of, the second housing 202 as the first housing 201 slides.

According to various embodiments, the second display area A2 may be substantially moved while being guided by the multi-bar structure (e.g., the display supporting member 213 of FIG. 4) mounted in the first housing 201 and may be thus received in, or visually exposed to the outside of, the second housing 202 or a space formed between the first housing 201 and the second housing 202. According to an embodiment, the second display area A2 may be moved based on the sliding movement of the first housing 201 in the width direction (e.g., the direction indicated by the arrow ①). For example, at least a portion of the second display area A2 may be unfolded or rolled together with the display supporting member 213 based on sliding of the first housing 201.

According to various embodiments, when viewed from above the first housing 201, if the first housing 201 moves from the closed state to the opened state, the second display area A2 may be gradually exposed to the outside of the housing 202 to be substantially coplanar with the first display area A1. In an embodiment, the second display area A2 may be at least partially received in the first housing 201 and/or the second housing 202.

According to various embodiments, the electronic device 101 may include at least one key input device 241, a connector hole 243, audio modules 247a and 247b, or camera modules 249a and 249b. Although not shown, the electronic device 101 may further include an indicator (e.g., a light emitting diode (LED) device) or various sensor modules. The configuration of the audio module 247a and 247b and camera modules 249a and 249b of FIGS. 2 and 3 may be identical in whole or part to the configuration of the audio module 170 and the camera module 180 of FIG. 1.

According to various embodiments, the key input device 241 may be positioned in one area of the first housing 201. Depending on the appearance and the state of use, the electronic device 101 may be designed to omit the illustrated key input device 241 or to include additional key input device(s). According to an embodiment, the electronic device 101 may include a key input device (not shown), e.g., a home key button or a touchpad disposed around the home key button. According to an embodiment (not shown), at least a portion of the key input device 241 may be disposed on the second housing 202.

According to various embodiments, the key input device 241 may be used as a driving structure for automatically or semi-automatically providing a slide in-out motion of the display 203. For example, when the user presses an open trigger button (e.g., the key input device 241 of FIG. 2) exposed outside the electronic device 101, the display 203 may automatically slide in or out (automatic operation). As another example, when the user slides out the display 203 by pushing the display 203 of the electronic device 101 up to a designated section, for the remaining section, it may be completely slid out by the force of an elastic member (not shown) and/or a driving body (not shown) mounted in the electronic device 101 (semi-automatic operation). For example, the electronic device 101 may slide out in the closed state (e.g., FIG. 2) and switch to the opened state (e.g., FIG. 3). The slide-in motion of the electronic device 101 may also be performed to correspond to the slide-out motion.

According to various embodiments, the connector hole 243 may be omitted or may receive a connector (e.g., a universal serial bus (USB) connector) for transmitting and receiving power and/or data with an external electronic device. Although not shown, the electronic device 101 may include a plurality of connector holes 243, and some of the plurality of connector holes 243 may function as connector holes for transmitting/receiving audio signals with an external electronic device. In the illustrated embodiment, the connector hole 243 is disposed in the 2-3th sidewall 123c, but the present disclosure is not limited thereto. The connector hole 243 or a connector hole not shown may be disposed in the 2-1th sidewall 221a or the 2-2th sidewall 221b.

According to various embodiments, the audio modules 247a and 247b may include at least one speaker hole 247a and 247b or at least one microphone hole. At least one of the speaker holes 247a and 247b may be provided as an external speaker hole. At least one of the speaker holes 247a and 247b may be provided as a receiver hole for voice call. The electronic device 101 may include a microphone for obtaining sound. The microphone may obtain external sound of the electronic device 100 through the microphone hole. According to an embodiment, the electronic device 101 may include a plurality of microphones to detect the direction of sound. According to an embodiment, the electronic device 101 may include an audio module in which the speaker holes 247a and 247b and the microphone hole are implemented as one hole or may include a speaker without the speaker hole 247a (e.g., a piezo speaker).

According to various embodiments, the camera modules 249a and 249b may include a first camera module 249a and/or a second camera module 249b. The second camera module 249b may be positioned in the second housing 202 and may capture a subject in a direction opposite to the first display area A1 of the display 203. The electronic device 101 may include a plurality of camera modules 249a and 249b. For example, the electronic device 101 may include at least one of a wide-angle camera, a telephoto camera, or a close-up camera. According to an embodiment, the electronic device 200 may measure the distance to the subject by including an infrared projector and/or an infrared receiver. The camera modules 249a and 249b may include one or more lenses, an image sensor, and/or an image signal processor. The electronic device 101 may further include another camera module (first camera module 249a, e.g., a front camera) that captures a subject in a direction opposite to the second camera module 249b. For example, the first camera module 249a may be disposed around the first display area A1 or in an area overlapping the first display area A1. If disposed in an area overlapping the display 203, the first camera module 249a may capture the subject through the display 203.

According to various embodiments, an indicator (e.g., an LED device) of the electronic device 101 may be disposed on the first housing 201 and/or the second housing 202, and the indicator may include a light emitting diode to provide state information about the electronic device 101 as a visual signal. The sensor module (e.g., the sensor module 176 of FIG. 1) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). In an embodiment, the electronic device 101 may include at least one of a gesture sensor, a gyro sensor, an atmospheric pressure sensor, a magnetic sensor, an accelerometer, a grip sensor, a color sensor, an infrared (IR) sensor, a temperature sensor, a humidity sensor, or an illuminance sensor. The configuration of the display 203, audio module 247a and 247b, and camera module 249a and 249b of FIGS. 2 and 3 may be identical in whole or part to the configuration of the display module 160, the audio module 170, and the camera module 180 of FIG. 1.

FIG. 4 is an exploded perspective view illustrating an electronic device according to an embodiment of the disclosure.

Referring to FIG. 4, an electronic device 101 may include a first housing 201, a second housing 202, a display 203, and a display supporting member 213. A portion (e.g., the second display area A2) of the display 203 may be received in the electronic device 101 while being guided by the display supporting member 213. The configuration of the first housing 201, the second housing 202, and the display 203 of FIG. 4 may be identical in whole or part to the configuration of the first housing 201, the second housing 202, and the display 203 of FIGS. 2 and/or 3.

According to various embodiments, the first housing 201 may include a first plate 211 and a slide cover 212. The first plate 211 and the slide cover 212 may linearly reciprocate in one direction (e.g., the direction of arrow 1̂ in FIG. 3) while being guided by the second housing 202. According to an embodiment, the first plate 211, along with the slide cover 212, may slide with respect to the second housing 202. For example, at least a portion of the display 203 and/or at least a portion of the display supporting member 213 may be disposed between the first plate 211 and the slide cover 212.

According to an embodiment, the first plate 211 may support at least a portion of the display 203 (e.g., the second display area A2). For example, the first plate 211 may include a curved surface 250. At least a portion of the second display area A2 of the display 203 may be positioned on the curved surface 250. According to an embodiment, the first plate 211 may be a display support bar (DSB) and/or a display support plate (DSP).

According to an embodiment, the slide cover 212 may protect the display 203 positioned on the first plate 211. For example, the slide cover 212 may surround at least a portion of the display 203. At least a portion of the display 203 may be positioned between the first plate 211 and the slide cover 212. According to an embodiment, the first plate 211 and the slide cover 212 may be formed of or include a metal material and/or a non-metal (e.g., polymer) material.

According to various embodiments, the first housing 201 may include a guide rail 215. According to an embodiment, the guide rail 215 may be connected to the first plate 211 and/or the slide cover 212. For example, the guide rail 215, along with the first plate 211 and the slide cover 212, may slide with respect to the second housing 202.

According to various embodiments, the electronic device 101 may include a display supporting member 213. According to an embodiment, the display supporting member 213 may support the display 203. For example, the display supporting member 213 may be connected with the display 203. According to an embodiment, at least a portion of the display 203 and the display supporting member 213 may be positioned between the first plate 211 and the slide cover 212. According to an embodiment, as the first housing 201 slides, the display supporting member 213 may move with respect to the second housing 202. In the closed state (e.g., FIG. 2) of the display supporting member 213, most of the structure may be received in the second housing 202. According to an embodiment, at least a portion of the display supporting member 213 may move corresponding to the curved surface 250 positioned at the edge of the first plate 211.

According to various embodiments, the display supporting member 213 may include a plurality of bars 214 (or rods). For example, the display supporting member 213 may be referred to as a multi-bar structure. The plurality of rods 214 may extend in a straight line and be disposed parallel to the rotational axis R formed by the curved surface 250, and the plurality of rods 214 may be arranged along a direction perpendicular to the rotational axis R (e.g., the direction along which the first housing 201 slides).

According to various embodiments, each rod 214 may pivot around another adjacent rod 214 while remaining parallel with the other adjacent rod 214. According to an embodiment, as the first housing 201 slides, the plurality of rods 214 may be arranged to form a curved shape or may be arranged to form a planar shape. For example, as the first housing 201 slides, a portion of the display supporting member 213 facing the curved surface 250 may form a curved surface, and another portion of the display supporting member 213 that does not face the curved surface 250 may form a flat surface. According to an embodiment, the second display area A2 of the display 203 may be mounted or supported on the display supporting member 213, and in the opened state (e.g., FIG. 3), at least a portion of the second display area A2, along with the first display area A1, may be visually exposed to the outside of the second housing 202. In the state in which the second display area A2 is visually exposed to the outside of the second housing 202, the display supporting member 213 may substantially form a flat surface, thereby supporting or maintaining the second display area A2 in the flat state. According to an embodiment, the display supporting member 213 may be replaced with a bendable integral supporting member (not shown).

According to an embodiment, the display supporting member 213 may be a multi-bar or articulated hinge structure.

According to various embodiments, the guide rail 215 may guide the movement of the plurality of rods 214. According to an embodiment, the guide rail 215 may include an upper guide rail adjacent to the 1-2th sidewall (e.g., the 1-2th sidewall 211b in FIG. 3) and a lower guide rail adjacent to the 1-3th sidewall (e.g., the 1-3th sidewall 211c). According to an embodiment, the guide rail 215 may include a groove-shaped rail 215a formed inside the guide rail 215 and a protrusion 215b positioned inside the guide rail. At least a portion of the protrusion 215b may be surrounded by the rail 215a. According to an embodiment, the display supporting member 213 may be positioned between the upper guide rail and the lower guide rail and may move while remaining engaged with the upper and lower guide rails. For example, upper and/or lower portions of the plurality of rods 214 may slide along the rail 215a while fitted into the rail 215a.

According to an embodiment, when the electronic device 101 is opened (e.g., a slide-out motion), the size of the area where the display 203 is visually exposed to the outside may be increased. For example, the first plate 211, which receives the driving force of the motor structure 260 through the gear assembly 270 (e.g., the gear assembly 300 of FIG. 5), may be slid out, and the protrusion 215b inside the guide rail 215 may push out the upper and/or lower ends of the plurality of rods 214. Accordingly, the display 203 received between the first plate 211 and the slide cover 212 may be expanded.

According to an embodiment, when the electronic device 101 is closed (e.g., a slide-in motion), the size of the area where the display 203 is visually exposed to the outside may be reduced. For example, by driving the motor structure 260 (e.g., driving for sliding in the display) and/or by an external force provided by the user, the first plate 211 may be slid in, and the outer portion (e.g., a portion other than the protrusion 215b) of the guide rail 215 may push out the upper and/or lower ends of the plurality of rods 214. Accordingly, the expanded display 203 may be received between the first plate 211 and the slide cover 212.

According to various embodiments, the second housing 202 may include a second plate 221, a cover member 222, and a rear plate 223. According to an embodiment, the second plate 221 may support at least a portion (e.g., the first display area A1) of the display 203. The second plate 221 may be disposed between the display 203 and the circuit board 204. According to an embodiment, the second plate 221 may be referred to as a front structure receiving at least part of the components of the electronic device 101. According to an embodiment, the cover member 222 may receive components (e.g., the battery 289 (e.g., the battery 189 of FIG. 1) and the circuit board 204) of the electronic device 101 and may protect the components of the electronic device 101. According to an embodiment, the cover member 222 may be referred to as a book cover.

According to various embodiments, a plurality of circuit boards may be received in the second housing 202. A processor, memory, and/or interface may be mounted on the circuit board 204 which is the main board. The processor may include one or more of, e.g., a central processing unit, an application processor, a graphic processing device, an image signal processing, a sensor hub processor, or a communication processor. According to various embodiments, the circuit board 204 may include a flexible printed circuit board type radio frequency cable (FRC). For example, the circuit board 204 may be disposed in the cover member 222 and may be electrically connected with an antenna module (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to various embodiments, the electronic device 101 may further include a separate sub circuit board 290 spaced apart from the circuit board 204 in the second housing 202. The sub circuit board 290 may be electrically connected with the circuit board 204 through the flexible circuit board 291. The sub circuit board 290 may be electrically connected with electrical components disposed in an end of the electronic device 101, such as the battery 289 or a speaker and/or a sim socket, and may transfer signals and power.

According to an embodiment, the battery 289 may be a device for supplying power to at least one component of the electronic device 101. The battery 189 may include, e.g., a primary cell which is not rechargeable, a secondary cell which is rechargeable, or a fuel cell. At least a portion of the battery 289 may be disposed on substantially the same plane as the circuit board 204. The battery 289 may be integrally or detachably disposed inside the electronic device 101.

According to various embodiments, the battery 289 may be formed as a single embedded battery or may include a plurality of removable batteries (e.g., the first battery 289a and the second battery 289b). According to an embodiment, when the embedded battery is positioned on the first plate 211, the embedded battery may move as the first plate 211 slides. According to an embodiment, when the embedded battery is positioned on the second plate 221, the embedded battery may be fixedly disposed on the second plate 221, regardless of the sliding movement of the first plate 211. As another example, when the first battery 289a of the removable batteries is positioned on the first plate 211, and the second battery 289b of the removable batteries is fixedly positioned on the second plate 221, only the first battery 289a may move as the first plate 211 slides.

According to various embodiments, the rear plate 223 may substantially form at least a portion of the exterior of the second housing 202 or the electronic device 101. For example, the rear plate 223 may be coupled to the outer surface of the cover member 222. According to an embodiment, the rear plate 223 may be integrally formed with the cover member 222. According to an embodiment, the rear plate 223 may provide a decorative effect on the exterior of the electronic device 101. The second plate 221 and the cover member 222 may be formed of or include at least one of a metal or a polymer, and the rear plate 223 may be formed of or include at least one of metal, glass, synthetic resin or ceramic. According to an embodiment, the second plate 221, the cover member 222 and/or the rear plate 223 may be formed of or include a material that transmits light at least partially (e.g., the auxiliary display area). For example, in a state in which a portion of the display 203 (e.g., the second display area A2) is received in the electronic device 101, the electronic device 101 may output visual information using the second display area A2. The auxiliary display area may be a portion of the second plate 221, the cover member 222, and/or the rear plate 223 in which the display 203 received in the second housing 202 is positioned.

The electronic device 101 disclosed in FIGS. 2, 3, and 4 has a rollable or slidable appearance but the present disclosure is not limited in this respect. According to an embodiment (not shown), at least a portion of the illustrated electronic device may be rolled up in a scroll shape.

Referring to FIGS. 2, 3, and 4, when viewed from the front of the electronic device 101, the display 203 may expand to the right of the electronic device 101. However, the structure of the electronic device 101 is not limited in this respect. For example, according to an embodiment, the display 203 may expand to the left of the electronic device 101. According to an embodiment, the display 203 may expand in the length direction of the electronic device 101.

Figure 5:
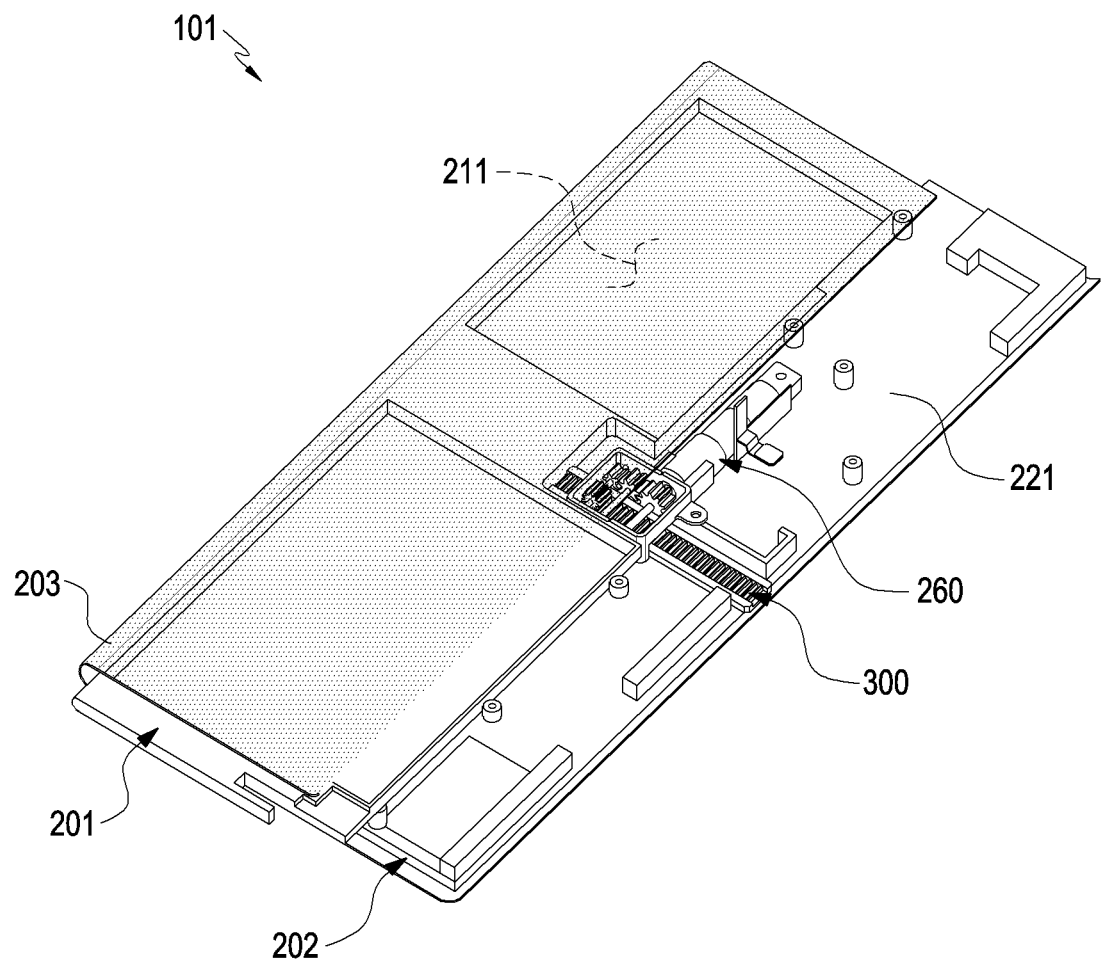
FIG. 5 is a perspective view illustrating an electronic device including a gear assembly and a motor structure according to an embodiment of the disclosure.
Figure 6A:
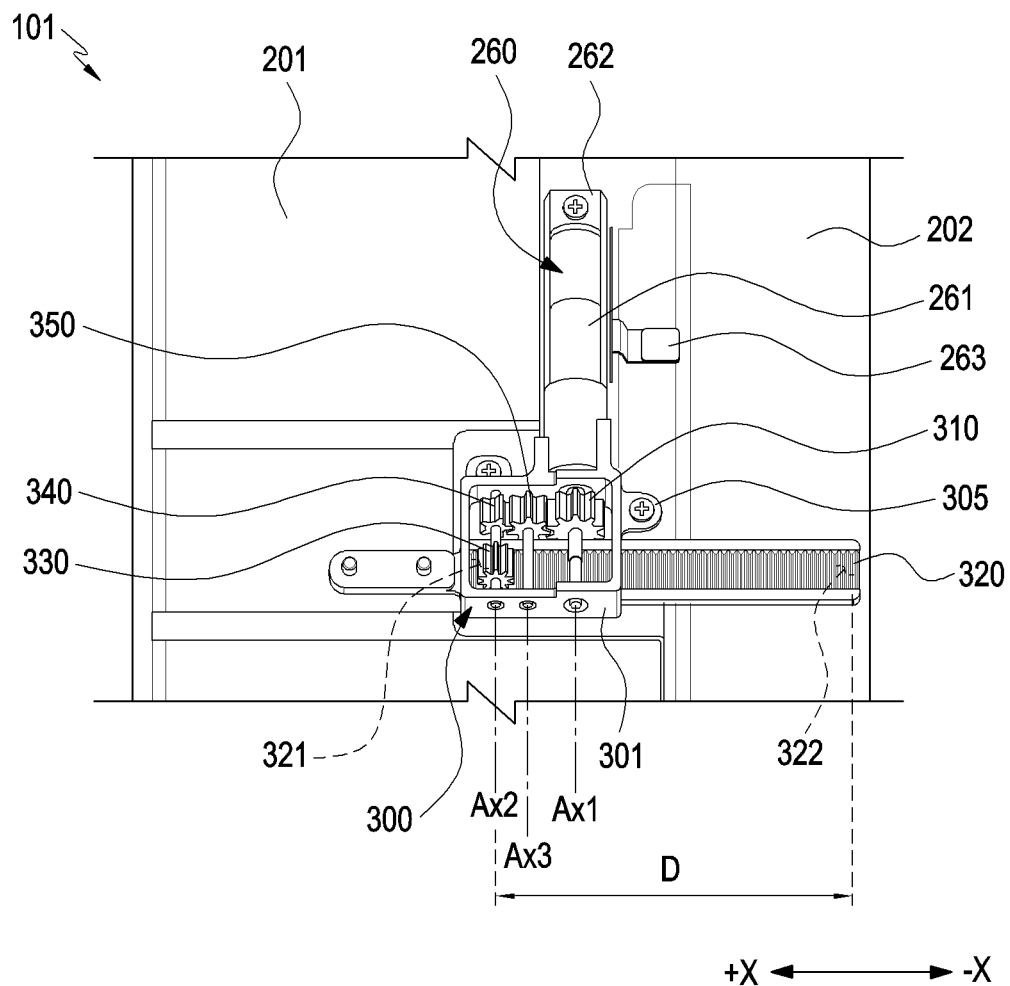
FIGS. 6A and 6B are perspective views illustrating a closed state of an electronic device with a display excluded, according to an embodiment of the disclosure.
Figure 6B:
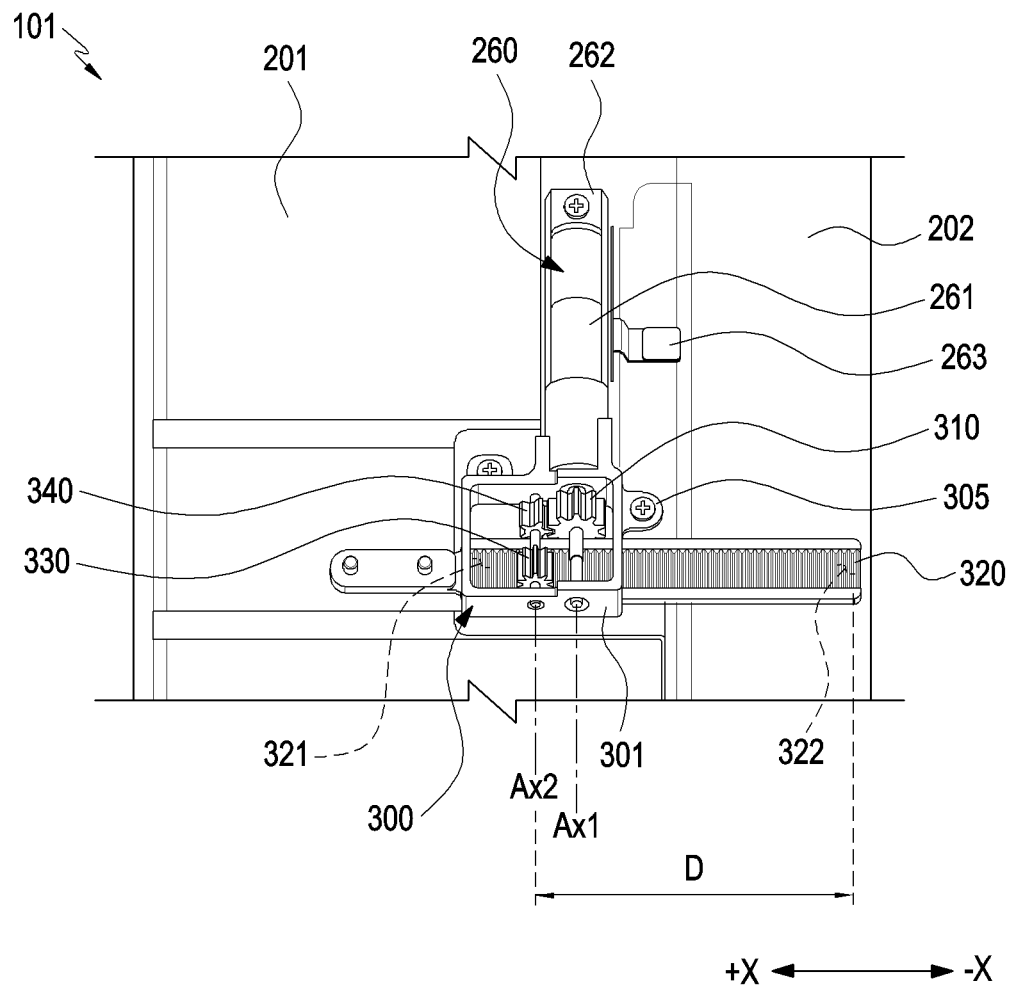
Figure 7:
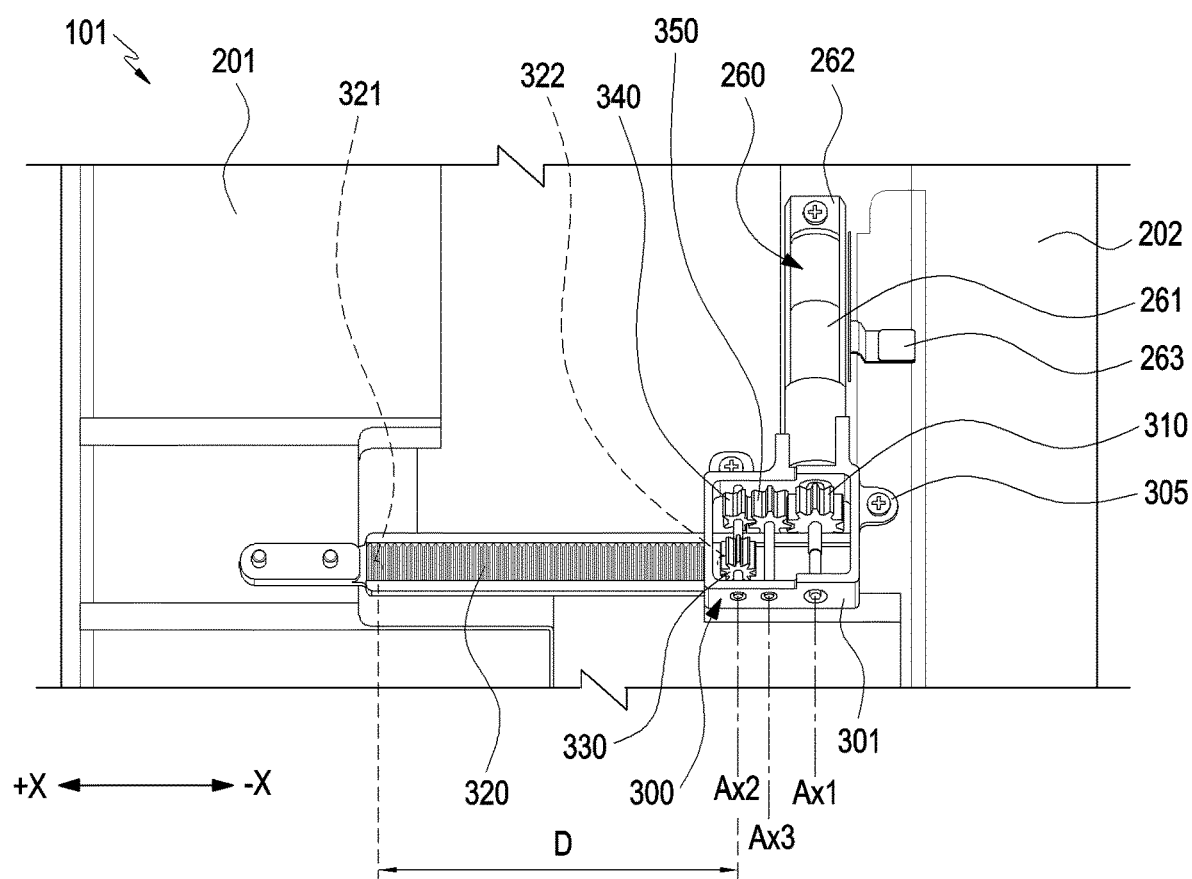
FIG. 7 is a perspective view illustrating an opened state of an electronic device with a display excluded, according to an embodiment of the disclosure.
Figure 8:
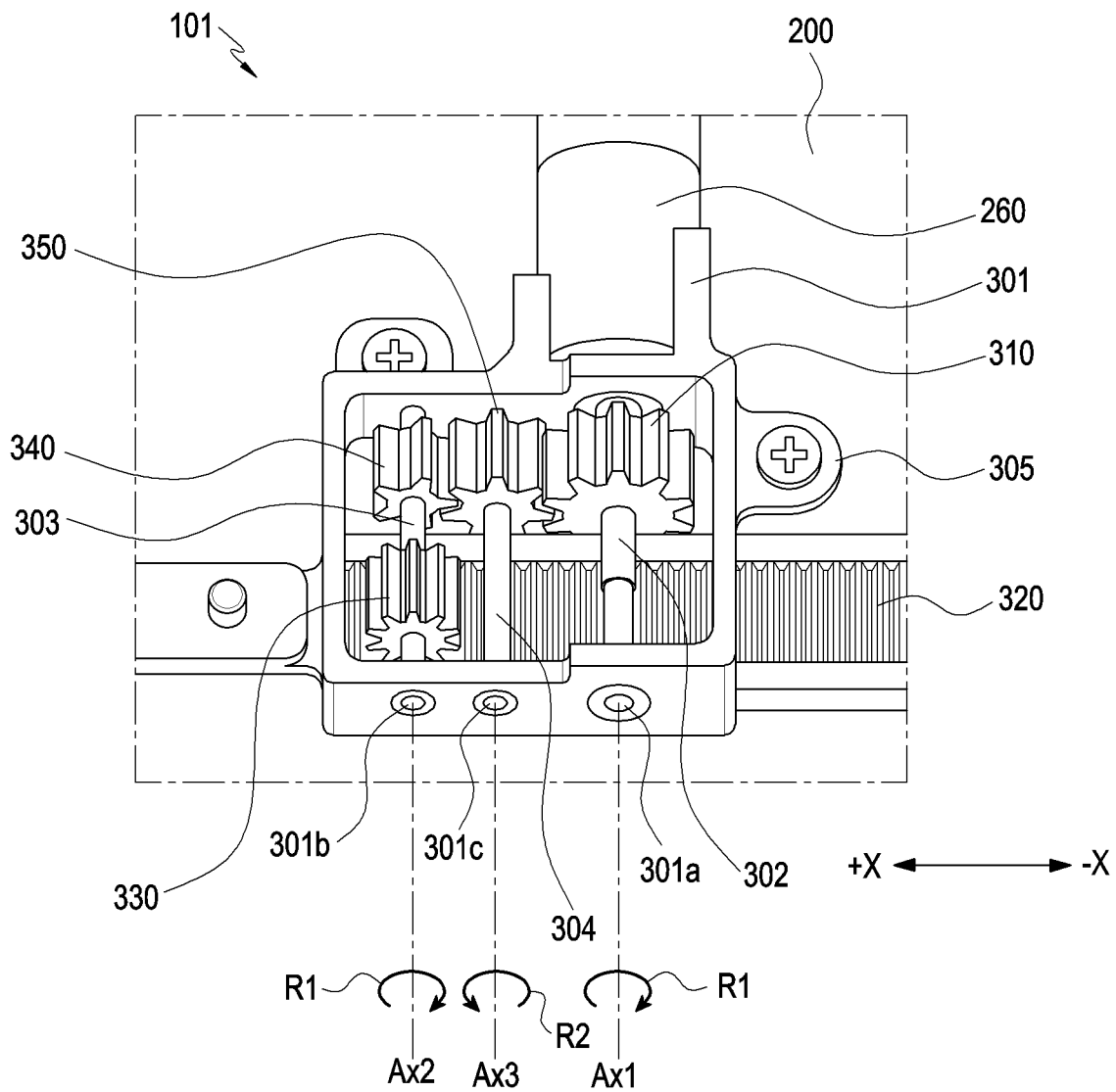
FIG. 8 is an enlarged view illustrating a motor structure and a gear assembly according to an embodiment of the disclosure.

FIG. 5 is a perspective view illustrating an electronic device including a gear assembly and a motor structure according to an embodiment of the disclosure. FIGS. 6A and 6B are perspective views illustrating a closed state of an electronic device with a display excluded, according to an embodiment of the disclosure. FIG. 7 is a perspective view illustrating an opened state of an electronic device with a display excluded, according to an embodiment of the disclosure. FIG. 8 is an enlarged view illustrating a motor structure and a gear assembly according to an embodiment of the disclosure.

Referring to FIG. 5, 6A, 6B, 7, and/or 8, the electronic device 101 may include a first housing 201, a second housing 202, a display 203, a motor structure 260, and a gear assembly 300. The configuration of the first housing 201, the second housing 202, and the display 203 of FIGS. 5, 6A, 6B, 7, and/or 8 may be identical in whole or part to the configuration of the first housing 201, the second housing 202, and the display 203 of FIGS. 2, 3, and 4.

According to an embodiment, the motor structure 260 may generate power for sliding the electronic device 101. For example, the motor structure 260 may include a motor core 261 capable of converting electrical energy into kinetic energy (e.g., rotational energy). According to an embodiment, the motor structure 260 may be connected to a portion (e.g., a first gear 310) of the gear assembly 300 and transfer a driving force to the first gear 310.

According to an embodiment, the motor structure 260 may be disposed on the second housing 202. For example, the motor structure 260 may be connected to at least a portion (e.g., the second plate 221) of the second housing 202. According to an embodiment, the motor structure 260 does not directly slide, so that the size of the motor structure 260 may be increased, and the internal space where the components of the electronic device 101 may be positioned may be increased. According to an embodiment, the motor structure 260 may include a motor bracket 262 connecting the motor core 261 and at least a portion (e.g., the second plate 221) of the second housing 202.

According to an embodiment, the motor structure 260 may be controlled by a processor (e.g., the processor 120 of FIG. 1). For example, the processor 120 may include a motor driver driving circuit and provide a pulse width modulation (PWM) signal for controlling the speed of the motor structure 260 and/or the torque of the motor structure 260 to the motor structure 260. According to an embodiment, the motor structure 260 may include a flexible printed circuit board 263 that electrically connects the processor 120 and the motor core 261.

According to an embodiment, the gear assembly 300 may transfer at least a portion of the driving force generated by the motor structure 260. For example, the gear assembly 300 may transfer a driving force for a slide-in and/or slide-out motion of the electronic device 101 to the first housing 201 and/or the second housing 202.

According to an embodiment, the gear assembly 300 may include a plurality of gears (e.g., the first gear 310, the rack gear 320, the second gear 330, the third gear 340, and/or the fourth gear 350) for transferring at least a portion of the driving force generated by the motor core 261 connected to the second housing 202 to the first housing 201. According to an embodiment, the gear assembly 300 may include a gear bracket 301 for receiving one or more (e.g., the first gear 310, the second gear 330, the third gear 340, and/or the fourth gear 350) among the plurality of gears 310, 320, 330, 340, and 350. The gear bracket 301 may surround the first gear 310, the second gear 330, the third gear 340, and/or the fourth gear 350. According to an embodiment, the gear bracket 301 may be connected to the second housing 202 using at least one fastening member 305. The gear bracket 301 may be connected to the same housing (e.g., the second housing 202) as that of the motor structure 260.

According to an embodiment, the gear assembly 300 may include the first gear 310 connected to the motor structure 260. The first gear 310 may be connected to the motor core 261 and be rotated based on the rotation of the motor core 261. According to an embodiment, when the electronic device 101 slides out, the first gear 310 may be rotated in a first rotation direction R1 along the first rotational axis Ax1. According to an embodiment, the first gear 310 may be referred to as a driving gear.

According to an embodiment, the gear assembly 300 may include a first shaft 302 connected to the first gear 310. The first shaft 302 may extend along the first rotational axis Ax1.

According to an embodiment, a rack gear 320 connected to the first housing 201 may be included. According to an embodiment, the driving force generated by the motor core 261 may be transferred to the rack gear 320 through the first gear 310, the fourth gear 350, the third gear 340, and the second gear 330. According to an embodiment, the rack gear 320 may be extended along the slide direction (e.g., X-axis direction) of the electronic device 101 by the driving force of the motor structure 260, received through the first gear 310, the fourth gear 350, the third gear 340, and the second gear 330.

According to an embodiment, the rack gear 320 may be connected to the housing different from that of the motor structure 260. For example, the motor structure 260 may be connected to the second housing 202 (e.g., the second plate 221), and the rack gear 320 may be connected to a portion (e.g., the first plate 211) of the first housing 201. According to an embodiment, the rack gear 320 may move relative to the motor structure 260. According to an embodiment, at least a portion of the driving force received from the first gear 310 may be transferred to the rack gear 320 through another gear (e.g., the second gear 330, the third gear 340, and/or the fourth gear 350), so that the slide distance D (or stroke length) where the rack gear 320 is movable may be increased. For example, as the rack gear 320 slides with respect to the second rotational axis Ax2 positioned further left (e.g., +X direction) than the first rotational axis Ax1, the distance where the rack gear 320 and/or the first housing 201 may move to the left may be increased. According to an embodiment, the slide distance D where the rack gear 320 is movable may be changed based on the length of the rack gear 320. The slide distance D may refer, for example, to a distance where the rack gear 320 connected to the first housing 201 moves with respect to the second housing 202.

According to an embodiment, the slide distance D may be the length to which the display 203 is extended. For example, the size in which the second display area (e.g., the second display area A2 of FIG. 4) of the display 203 is visually exposed to the outside of the electronic device 101 may be changed based on the slide distance D of the rack gear 320. For example, when the slide distance D where the rack gear 320 is movable is increased, the extended area of the display 203 may be increased.

According to an embodiment, the rack gear 320 may include a first end 321 and a second end 322 opposite to the first end 321. The first end 321 may be a portion of the rack gear 320 facing a portion (e.g., the 1-1th sidewall 211a of FIG. 3) of the first housing 201. The second end 322 may be a portion of the rack gear 320 that faces a portion (e.g., the 2-1th sidewall 221a of FIG. 3) of the second housing 202.

According to various embodiments, the slide distance D may be set to various values based on the structure of the gear assembly 300. For example, as the distance between the first gear 310 and the second gear 330 increases, the slide distance D may increase. According to an embodiment, the slide distance D may be a distance between the first end 321 and second end 322 of the rack gear 320.

The slide distance of the embodiment without the third gear 340 and the fourth gear 350 may be shorter than the slide distance D of the electronic device 101 including the third gear 340 and the fourth gear 350. For example, in the gear assembly 300 without the third gear 340 and the fourth gear 350, the second gear 330 may be rotated with respect to the same rotational axis (e.g., the first rotational axis Ax1) as the first gear 310, or the first gear 310 may contact the rack gear 320. In the embodiment without the third gear 340 and the fourth gear 350, the slide distance may be a distance between the first rotational axis Ax1 and the second end 321 of the second gear 320.

According to an embodiment, the number of interlocking gears (e.g., the third gear 340 and/or the fourth gear 350) may be varied depending on the design of the gear assembly 300. Referring to FIG. 6A, the driving force generated by the motor core 261 may be transferred to the rack gear 320 through the first gear 310, the fourth gear 350, the third gear 340, and the second gear 330. Referring to FIG. 6B, the driving force generated by the motor core 261 may be transferred to the rack gear 320 through the first gear 310, the third gear 340, and the second gear 330. The number of gears of the gear assembly 300 is not limited to the example embodiments disclosed herein. For example, the gear assembly 300 may include five or more gears.

According to an embodiment, the second gear 330, the third gear 340, and/or the fourth gear 350 may be, or be referred to as, an interlocking gear for transferring at least a portion of the driving force generated by the motor structure 260 to the first housing 201.

According to an embodiment, the gear assembly 300 may include a second gear 330 configured to mesh with the rack gear 320. According to an embodiment, the second gear 330 may rotate about the second rotational axis Ax2 substantially parallel to the first rotational axis Ax1. According to an embodiment, the rotation direction of the second gear 330 may be the same as the rotation direction of the first gear 310. For example, the second gear 330 may rotate in the first rotation direction R1. According to an embodiment, the second gear 330 may rotate based on the rotation of the first gear 310. For example, the second gear 330 may receive at least a portion of the rotational force of the first gear 310 through the fourth gear 350 and the third gear 340. According to an embodiment, the second gear 330 may be referred to as a pinion gear and/or a driven gear.

According to an embodiment, the gear assembly 300 may include a third gear 340 configured to rotate based on the rotation of the first gear 310. For example, the third gear 340 may mesh with the fourth gear 350 and receive at least a portion of the rotational force of the first gear 310 through the fourth gear 350. According to an embodiment, the third gear 340 may be connected to the second gear 330. For example, the second gear 330 and the third gear 340 may rotate about the same rotational axis (e.g., the second rotational axis Ax2). For example, the third gear 340 may rotate together with the second gear 330. According to an embodiment, the third gear 340 may be referred to as an interlocking gear (e.g., a first interlocking gear).

According to an embodiment, the second gear 330 and the third gear 340 may rotate in the same rotation direction as the first gear 310. For example, when the slide-out motion of the electronic device 101 is performed, the second gear 330 and the third gear 340 may rotate in the first rotation direction R1. According to an embodiment, the rotation speed of the second gear 330 and the rotation speed of the third gear 340 may be the same.

According to an embodiment, the gear assembly 300 may include a second shaft 303 connected to the second gear 330 and the third gear 340. The second shaft 303 may extend along the second rotational axis Ax2.

According to an embodiment, the gear assembly 300 may include a fourth gear 350 configured to mesh with the first gear 310 and the third gear 340. According to an embodiment, the fourth gear 350 may receive at least a portion of the driving force generated by the motor structure 260 through the first gear 310. The fourth gear 350 may be positioned between the first gear 310 and the third gear 340. For example, the fourth gear 350 may rotate about the third rotational axis Ax3 positioned between the first rotational axis Ax1 and the second rotational axis Ax2. The fourth gear 350 may rotate in a rotation direction different from that of the first gear 310, the second gear 330, and/or the third gear 340. For example, when the slide-out motion of the electronic device 101 is performed, the fourth gear 350 may rotate in the second rotation direction R2. According to an embodiment, the fourth gear 350 may be referred to as a bridge gear. According to an embodiment, the configuration of the fourth gear 350 may be varied. For example, the fourth gear 350 may be replaced with two or more gears for changing the stroke length, torque, and/or rotation speed or with a different component (e.g., the belt structure of FIG. 11) for transferring power. For example, the fourth gear 350 may include a component for reducing damage to the gear assembly 300 due to an overload of the motor structure 260 and/or an external force. According to an embodiment, the fourth gear 350 may include a component using contact and/or elasticity. For example, the fourth gear 350 may include a friction wheel. According to an embodiment, the fourth gear 350 may be referred to as an interlocking gear (e.g., a second interlocking gear).

According to an embodiment, the gear assembly 300 may include a second shaft 303 connected to the second gear 330 and the third gear 340. The second shaft 303 may extend along the second rotational axis Ax2.

According to an embodiment, the electronic device 101 may automatically or semi-automatically provide the slide in/out motion of the display 203 using the motor structure 260 and/or the gear assembly 300. For example, when the user presses an open trigger button (e.g., the key input device 241 of FIG. 2) exposed outside the electronic device 101, the display 203 may automatically slide in or out (automatic operation). As another example, when the user slides out the display 203 by pushing the display 203 of the electronic device 101 up to a designated section, for the remaining section, it may be completely slid out by the force of an elastic member (not shown) and/or an actuator (not shown) mounted in the electronic device 101 (semi-automatic operation).

Although the gear assembly 300 is illustrated as a rack and a pinion in FIGS. 5, 6A, 6B, 7, and 8, the structure of the gear assembly 300 is not limited thereto. For example, the gear assembly 300 may include a screw lead-type gear. FIGS. 5, 6A, 6B, 7, and 8 illustrate that the gears 310, 320, 330, 340, and 350 are spur gears, but the shapes of the gears 310, 320, 330, 340, and 350 are not limited thereto. For example, the gears 310, 320, 330, 340, and 350 may include a helical gear, a bevel gear, and/or a worm gear.

According to an embodiment, the gear assembly 300 may include a third shaft 304 connected to the fourth gear 350. The third shaft 304 may extend along a third rotational axis Ax3.

According to an embodiment, the gear bracket 301 may include bearing structures 301a, 301b, and 301c that receive the shafts 302, 303, and 304. For example, the gear bracket 301 may include a first bearing structure 301a for reducing the frictional force generated from rotation of the first shaft 302, a second bearing structure 301b for reducing the frictional force generated from rotation of the second shaft 303, and/or a third bearing structure 301c for reducing the frictional force generated from rotation of the third shaft 304.

According to various embodiments, the torque and/or rotation speed of the driving force generated by the motor structure 260 may be changed using the gear assembly 300. For example, the torque and/or rotation speed of the driving force generated from the motor structure 260 may be changed based on the gear ratio of the first gear 310, the second gear 330, the third gear 340, and/or the fourth gear 350. According to an embodiment, a first diameter of the first gear 310 may be larger than a fourth diameter of the fourth gear 350, and the fourth diameter of the fourth gear 350 may be larger than a second diameter of the second gear 330 (or a diameter of the third gear 340). When the first diameter (or number of gear teeth) of the first gear 310 is larger than the second diameter (or number of gear teeth) of the second gear 330 and/or the third diameter (or number of gear teeth) of the third gear 340, the speed of the slide-out and/or slide-in motion of the electronic device 101 may be increased.

According to an embodiment, the second diameter (or number of gear teeth) of the second gear 330 may be equal to or larger than the third diameter (or number of gear teeth) of the third gear 340. When the second diameter (or number of gear teeth) of the second gear 330 is larger than the third diameter (or number of gear teeth) of the third gear 340, the speed of the slide-out and/or slide-in motion of the electronic device 101 may be increased.

According to an embodiment not shown, the first diameter of the first gear 310 may be smaller than the second diameter of the second gear 330 (or the diameter of the third gear 340). When the first diameter (or number of gear teeth) of the first gear 310 is smaller than the second diameter (or number of gear teeth) of the second gear 330, the torque transferred to the rack gear 320 may be increased.

According to an embodiment, in the electronic device 101 including the same motor structure 260, the reduction ratios of the gears 310, 330, 340, and 350 of the gear assembly 300 may be set to various values considering torque and/or rotational speed.

Figure 9:
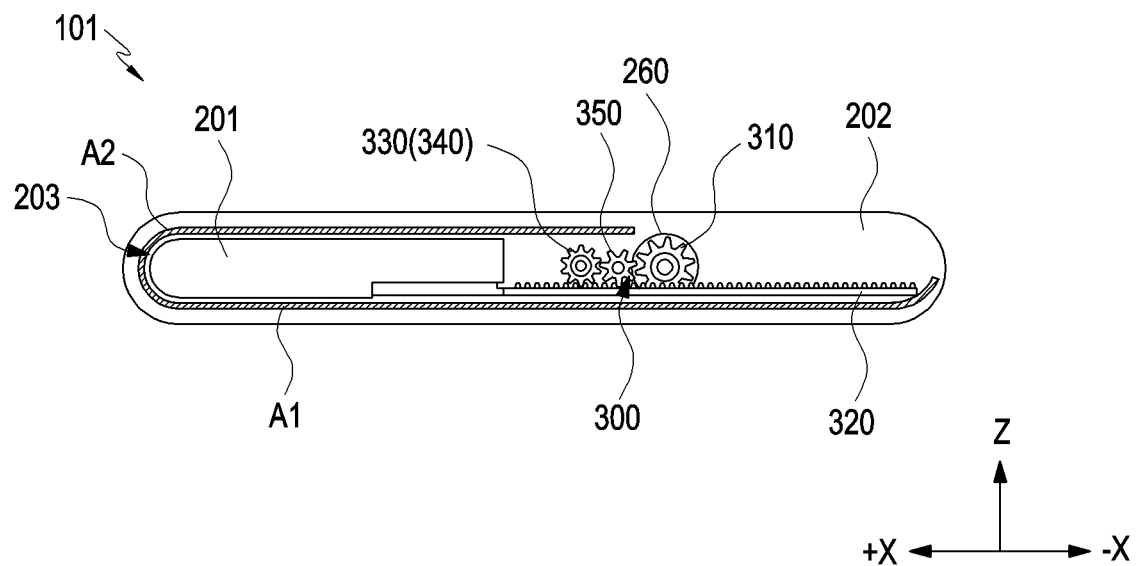
FIG. 9 is a cross-sectional view illustrating a closed state of an electronic device according to an embodiment of the disclosure.
Figure 10:
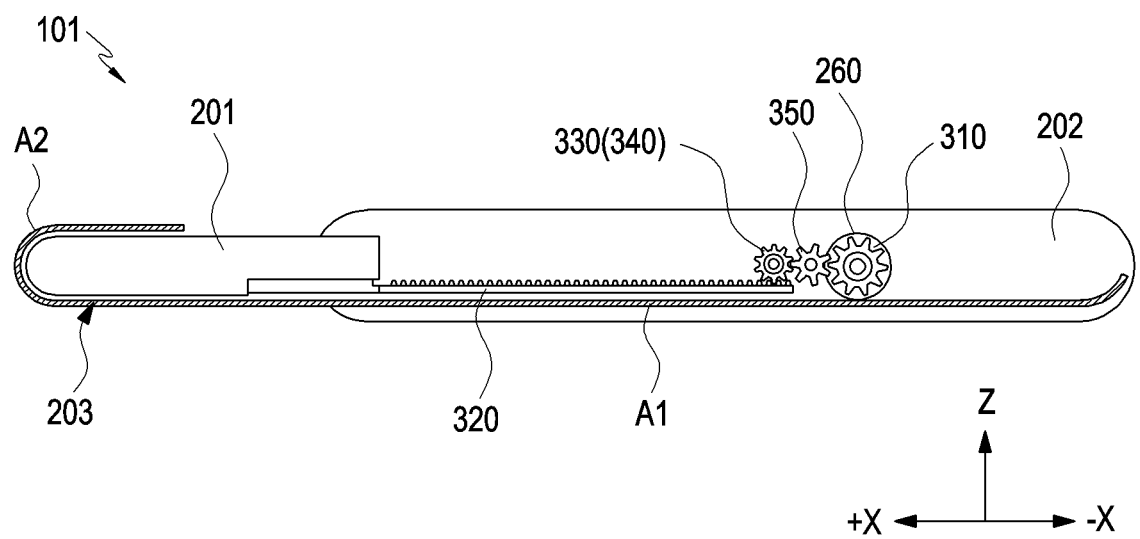
FIG. 10 is a cross-sectional view illustrating an opened state of an electronic device according to an embodiment of the disclosure.

FIG. 9 is a cross-sectional view illustrating a closed state of an electronic device according to an embodiment of the disclosure. FIG. 10 is a cross-sectional view illustrating an opened state of an electronic device according to an embodiment of the disclosure.

Referring to FIGS. 9 and 10, an electronic device 101 may include a first housing 201, a second housing 202, a display 203, a motor structure 260, and a gear assembly 300. The configuration of the first housing 201, the second housing 202, the display 203, the motor structure 260, and the gear assembly 300 of FIG. 9 and/or 10 may be identical in whole or part to the configuration of the first housing 201, the second housing 202, the display 203, the motor structure 260, and the gear assembly 300 of FIG. 5.

According to an embodiment, in the closed state (e.g., FIG. 9) of the electronic device 101, at least a portion of the gear assembly 300 may be positioned midway of the display 203. For example, the second gear 330, the third gear 340, and/or the fourth gear 350 of the gear assembly 300 may be positioned between the first display area A1 and the second display area A2. For example, when the electronic device 101 is viewed from thereabove (Z-axis direction) in the closed state of the electronic device 101, the second gear 330, the third gear 340 and/or the fourth gear 350 may face or overlap the second display area A2 of the display 203. According to an embodiment, in the closed state of the electronic device 101, the motor structure 260 may not face the second display area A2. For example, the first gear 310 and/or the motor structure 260 may be disposed inside the second housing 202 where the display 203 is not disposed. According to an embodiment, as the second gear 330, the third gear 340, and/or the fourth gear 350 may face or overlap the second display area A2 of the display 203, and the first gear 310 and/or the motor structure 260 does not face the second display area A2, the slide distance of the rack gear 320 may be increased, and the size of a space in which the motor structure 260 may be positioned may be increased.

Figure 11:
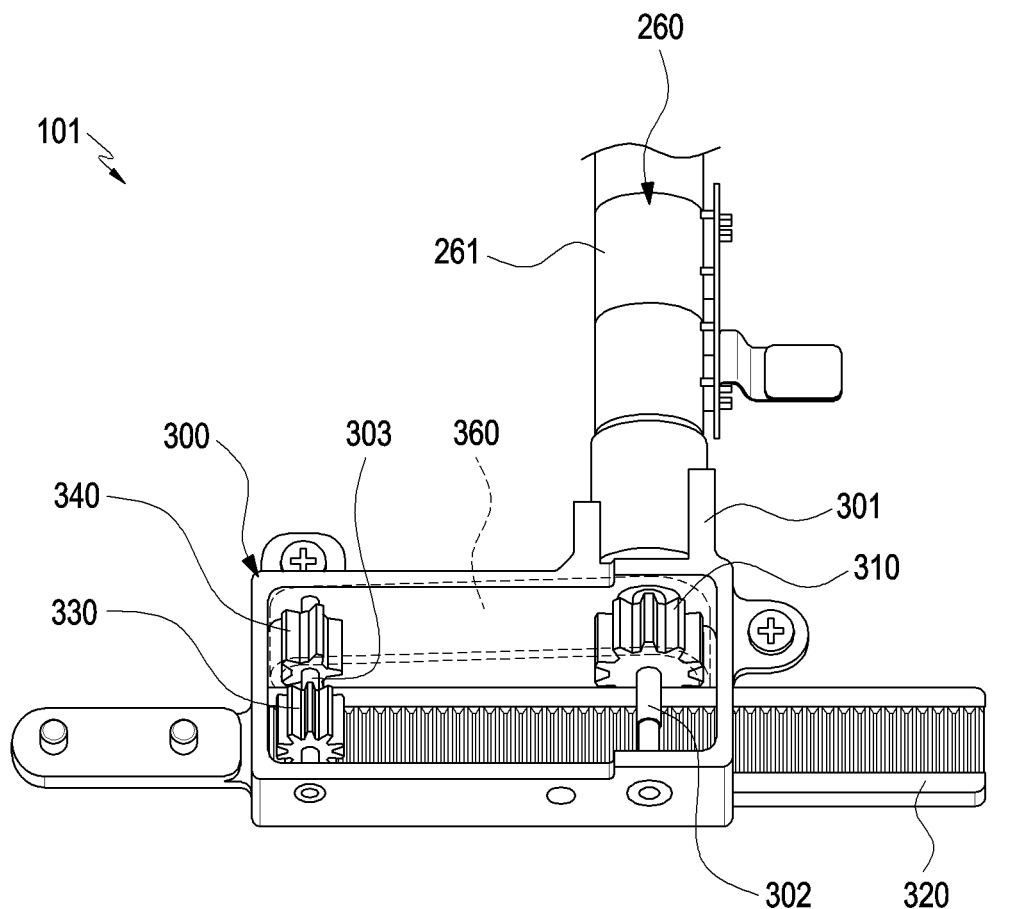
FIG. 11 is a perspective view illustrating an electronic device including a belt structure according to an embodiment of the disclosure.

FIG. 11 is a perspective view illustrating an electronic device including a power transfer structure according to an embodiment of the disclosure.

Referring to FIG. 11, the electronic device 101 may include a motor structure 260 and a gear assembly 300. The configuration of the motor structure 260 and the gear assembly 300 of FIG. 11 may be identical in whole or part to the configuration of the motor structure 260 and the gear assembly 300 of FIG. 5.

According to an embodiment, the gear assembly 300 may include a power transfer structure 360 connected to the first gear 310 and the third gear 340. The power transfer structure 360 may transfer at least a portion of the driving force generated due to the rotation of the first gear 310 to the third gear 340.

According to an embodiment, the power transfer structure 360 may have a closed loop shape. For example, the power transfer structure 360 may include a belt structure surrounding at least a portion of the first gear 310 and at least a portion of the third gear 340.

According to an embodiment, the power transfer structure 360 may include an elastic material (e.g., rubber). Due to the elastic force of the power transfer structure 360, the backlash of the gears (e.g., the first gear 310 and the third gear 340) may be reduced, and the efficiency of power transfer may be increased. According to an embodiment, the position where the rack gear 320 slides may be changed based on the length of the power transfer structure 360. According to an embodiment not shown, the power transfer structure 360 may be a caterpillar or chain structure.

An electronic device (e.g., a portable terminal) includes a display with a flat surface or both a flat and curved surface. An electronic device including a display may have a limitation in realizing a screen larger than the size of the electronic device due to the fixed display structure. Accordingly, research has been conducted on electronic devices including a rollable display.

The rolling or slide of the electronic device may be performed by a driving force generated by a motor of the electronic device. When the motor is disposed on the slide part of the housing, the size of the motor may be limited, so that the magnitude of the driving force generated by the motor may be limited. Further, when the motor of the electronic device is disposed on the slide part, the component (e.g., a flexible printed circuit board) for electrically connecting the motor to the processor may be damaged. When the motor is disposed on the main part of the housing, the slide distance of the electronic device and the area where the display may be extended may be reduced.

According to various embodiments of the disclosure, there may be provided an electronic device including a motor disposed on a main part while increasing an area where a display may be extended.

The disclosure is not limited to the foregoing embodiments but various modifications or changes may rather be made thereto without departing from the spirit and scope of the disclosure.

According to an embodiment of the disclosure, the electronic device may increase the sliding length of the electronic device using the gear assembly including the interlocking gear.

According to an embodiment of the disclosure, the electronic device may include a motor connected to a main structure. As the motor is connected to the main structure, the size of the motor may be increased, and the driving force of the motor may be increased.

According to an embodiment of the disclosure, an electronic device (e.g., the electronic device 101 of FIG. 3) may comprise a first housing (e.g., the first housing 201 of FIG. 3), a second housing (e.g., the second housing 202 of FIG. 3) receiving at least a portion of the first housing and configured to slide with respect to the first housing, a display (e.g., the display 203 of FIG. 3) configured to be unfolded based on sliding of the first housing, a motor structure (e.g., the motor structure 260 of FIG. 5) configured to generate a driving force for the sliding of the first housing, the motor structure disposed on the second housing, and a gear assembly (e.g., the gear assembly 300 of FIG. 5) including a first gear (e.g., the first gear 310 of FIG. 8) connected to the motor structure, a rack gear (e.g., the rack gear 320 of FIG. 8) connected to the first housing and configured to slide along with the first housing, a second gear (e.g., the second gear 330 of FIG. 8) configured to mesh with the rack gear, and a third gear (e.g., the third gear 340 of FIG. 8) connected to the second gear and configured to rotate based on rotation of the first gear.

According to an embodiment, the first gear may be configured to rotate in a first rotation direction (e.g., the first rotation direction R1 of FIG. 8) along a first rotational axis (e.g., the first rotational axis Ax1 of FIG. 6A). The second gear and the third gear may be configured to rotate in the first rotation direction along a second rotational axis (e.g., the second rotational axis Ax2 of FIG., 6A) parallel with the first rotational axis.

According to an embodiment, the display may include a first display area (e.g., the first display area A1 of FIG. 3) visually exposed to an outside of the electronic device and a second display area (e.g., the second display area A2 of FIG. 3) extending from the first display area and configured to be rolled or unfolded based on the sliding of the first housing.

According to an embodiment, the second gear and the third gear may be positioned between the first display area and the second display area in a closed state of the electronic device.

According to an embodiment, the first housing may include a first plate (e.g., the first plate 211 of FIG. 4) for guiding a movement of the second display area, and the second housing may include a second plate (e.g., the second plate 221 of FIG. 4) supporting the first display area.

According to an embodiment, the rack gear may be connected to the first plate, and the motor structure may be connected to the second plate.

According to an embodiment, the gear assembly may include a fourth gear (e.g., the fourth gear 350 of FIG. 6A) configured to mesh with the first gear and the third gear.

According to an embodiment, a fourth diameter of the fourth gear may be smaller than a first diameter of the first gear, and the fourth diameter may be larger than a third diameter of the third gear, and a second diameter of the second gear may be equal to or larger than the third diameter of the third gear.

According to an embodiment, the gear assembly may include a power transfer structure (e.g., the power transfer structure 360 of FIG. 11) connected to the first gear and the third gear. The third gear may be configured to receive at least a portion of a rotational force of the first gear through the power transfer structure.

According to an embodiment, the power transfer structure may include a belt structure formed in a closed loop shape.

According to an embodiment, the gear assembly may include a gear bracket (e.g., the gear bracket 301 of FIG. 8) surrounding at least a portion of the first gear, the second gear, and the third gear and connected to the second housing.

According to an embodiment, the rack gear may be configured to move relative to the motor structure.

According to an embodiment, the electronic device may further comprise a display supporting member (e.g., the display supporting member 213 of FIG. 4) supporting at least a portion of the display. The first housing may include a guide rail (e.g., the guide rail 215 of FIG. 4) for guiding a movement of the display supporting member.

According to an embodiment, the motor structure may include a motor core (e.g., the motor core 261 of FIG. 6A) for generating a driving force and a motor bracket (e.g., the motor bracket 262 of FIG. 6A) connecting the motor core and the second housing.

According to an embodiment, the rack gear may be a rack gear extending along a slide direction of the first housing.

According to an embodiment of the disclosure, an electronic device (e.g., the electronic device 101 of FIG. 3) may comprise a first housing (e.g., the first housing 201 of FIG. 3), a second housing (e.g., the second housing 202 of FIG. 3) configured to slide with respect to the first housing, a display (e.g., the display 203 of FIG. 4) including a first display area (e.g., the first display area A1 of FIG. 4) disposed on the second housing and a second display area (e.g., the second display area A2 of FIG. 4) extending from the first display area and configured to be unfolded based on sliding of the first housing, a motor structure (e.g., the motor structure 260 of FIG. 5) configured to generate a driving force for moving the first housing, the motor structure connected to the second housing, and a gear assembly (e.g., the gear assembly 300 of FIG. 6A) including a first gear (e.g., the first gear 310 of FIG. 6A) connected to the motor structure, a rack gear (e.g., the rack gear 320 of FIG. 6A) connected to the first housing and configured to slide along with the first housing, a second gear (e.g., the second gear 330 of FIG. 6A) configured to mesh with the rack gear, a third gear (e.g., the third gear 340 of FIG. 6A) configured to rotate, along with the second gear, based on rotation of the first gear, and a fourth gear (e.g., the fourth gear 350 of FIG. 6A) configured to mesh with the first gear and the third gear.

According to an embodiment, the second gear and the third gear may be positioned between the first display area and the second display area in a closed state of the electronic device.

According to an embodiment, the first housing may include a first plate (e.g., the first plate 211 of FIG. 4) for guiding a movement of the second display area, and the second housing may include a second plate (e.g., the second plate 221 of FIG. 4) supporting the first display area.

According to an embodiment, the rack gear may be connected to the first plate, and the motor structure may be connected to the second plate.

According to an embodiment, a fourth diameter of the fourth gear may be smaller than a first diameter of the first gear, and the fourth diameter may be larger than a third diameter of the third gear, and a second diameter of the second gear may be equal to or larger than the third diameter of the third gear.

While the disclosure has been illustrated and described with reference to various example embodiments, it will be understood that the various example embodiments are intended to be illustrative, not limiting. It will be further understood by those skilled in the art that various changes in form and detail may be made without departing from full scope of the disclosure, including the appended claims and their equivalents. It will also be understood that any of the embodiment(s) described herein may be used in conjunction with any other embodiment(s) described herein.

What is claimed is:

1. An electronic device comprising: a first housing; a second housing configured to receive at least a portion of the first housing, the first housing being configured to slide with respect to the second housing; a display including a first display area, and a second display area configured to be unfolded or folded based on sliding of the first housing; a motor configured to generate a driving force for the sliding of the first housing, the motor disposed on the second housing; and a gear assembly including a first gear connected to the motor, a rack gear connected to the first housing and configured to slide along with the first housing, a second gear configured to mesh with the rack gear, and a third gear connected to the second gear and configured to rotate based on rotation of the first gear, wherein the first gear is configured to rotate along a first rotational axis, and the second gear and the third gear are configured to rotate along a second rotational axis parallel with the first rotational axis.

2. The electronic device of claim 1, wherein the second rotational axis is positioned farther than the first rotational axis in a direction in which the first housing slides out of the second housing.

3. The electronic device of claim 1, wherein the first display area is visually exposed to an outside of the electronic device.

4. The electronic device of claim 3, wherein the second gear and the third gear are positioned between the first display area and the second display area in a closed state of the electronic device.

5. The electronic device of claim 3, wherein the first housing includes a first plate configured to guide a movement of the second display area, and the second housing includes a second plate configured to support the first display area.

6. The electronic device of claim 5, wherein the rack gear is connected to the first plate, and the motor is connected to the second plate.

7. The electronic device of claim 1, wherein the gear assembly includes a fourth gear configured to mesh with the first gear and the third gear.

8. The electronic device of claim 7, wherein a fourth diameter of the fourth gear is smaller than a first diameter of the first gear, and the fourth diameter is larger than a third diameter of the third gear, and
wherein a second diameter of the second gear is equal to or larger than the third diameter of the third gear.

9. The electronic device of claim 1, wherein the gear assembly includes a power transfer structure connected to the first gear and the third gear, and
wherein the third gear is configured to receive at least a portion of a rotational force of the first gear through the power transfer structure.

10. The electronic device of claim 9, wherein the power transfer structure includes a belt formed in a closed loop shape.

11. The electronic device of claim 1, wherein the gear assembly includes a gear bracket surrounding at least a portion of the first gear, the second gear, and the third gear and connected to the second housing.

12. The electronic device of claim 1, wherein the rack gear is configured to move relative to the motor.

13. The electronic device of claim 1, further comprising a multi-bar structure configured to support at least a portion of the display, and
wherein the first housing includes a guide rail configured to guide a movement of the multi-bar structure.

14. The electronic device of claim 1, wherein the motor includes a motor core configured to generate a driving force and a motor bracket connecting the motor core and the second housing.

15. The electronic device of claim 1, wherein the rack gear is a rack gear extending along a sliding direction of the first housing.

* * * * *